Sept. 27, 1960 R. W. BOND ET AL 2,954,306
PROCESS FOR AGGLOMERATING DEXTROSE
Filed Dec. 30, 1958
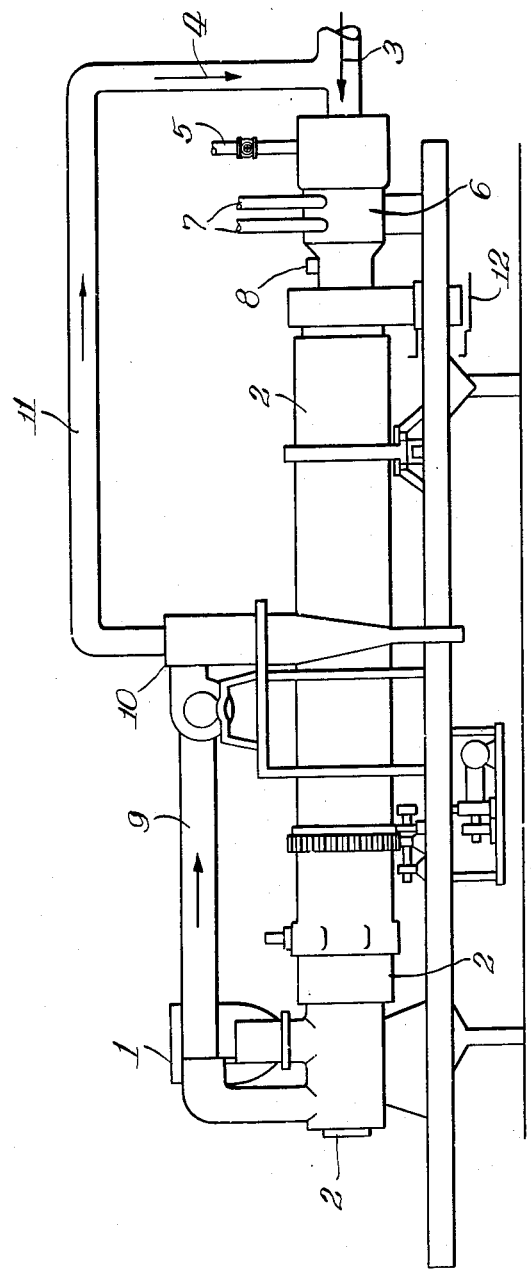
INVENTORS.
Robert W. Bond,
Edward C. Snyder
By Mildred Ouben
Attorney

United States Patent Office 2,954,306
Patented Sept. 27, 1960

2,954,306

PROCESS FOR AGGLOMERATING DEXTROSE

Robert W. Bond, Darien, Conn., and Edward C. Snyder, Hinsdale, Ill., assignors to Corn Products Company, a corporation of Delaware Filed Dec. 30, 1958, Ser. No. 783,837

3 Claims. (Cl. 127—63)

This invention relates to a new method for producing dextrose in agglomerated form.

Dextrose in agglomerated form is for the most part presently produced by accident rather than by design and is obtained as a byproduct of commercial dextrose hydrate production. The product presently available and which is referred to as coarse dextrose is obtained by screening out coarse particles of dextrose in the process of making the regular dextrose hydrate of commerce. A small amount of agglomerated dextrose is made by spraying a concentrated dextrose containing liquor onto a seed bed of dextrose.

These coarse dextrose particles or agglomerates are in great demand by the food industry and the supply is very limited. Coarse dextrose is desirable in making soft drink powders where caking is a problem. Coarse dextrose is also used in dusting gum drops and in peanut butter. In general the coarse products may be handled more easily because they are more free-flowing and cake less easily than the finer products. For example, when used in soft drink prowders, the coarse dextrose permits greater mobility of the powder in the small paper packages used to dispense the product. Furthermore, the coarse particles permit colorings and flavorings to be more easily distributed thereon because they do not cake.

We have now discovered that agglomerates or coarse particles of dextrose may be made by subjecting dextrose, preferably wet dextrose, to controlled conditions of temperature and humidity, i.e., the wet and dry bulb temperatures of the air should be within the range of about 90° F. to about 160° F., and 150° F. to and including superheated steam, respectively.

The most practical manner in which to carry out the invention is to subject dextrose centrifuge cake obtained in the manufacture of dextrose and which contains about 15 percent of moisture to drying air under the aforementioned conditions. It is particularly advantageous to treat, in accordance with the principles of the invention, dextrose "fines." Dextrose "fines" are the fine particles which pass through about a 100 mesh (0.149 mm.) screen obtained in the commercial manufacture of anhydrous and hydrate dextrose. Since moisture is required for agglomeration, it is not as practical to subject anhydrous dextrose to the treatment described although agglomeration thereof will take place if enough time is allowed for the treatment. When using centrifuge cake or wetted dextrose, the moisture content of the dextrose should not exceed 22 percent going into the dryer since the dextrose would go into solution on coming into contact with the humid air.

The agglomerating process may be carried out in standard drying equipment equipped with agitating or tumbling devices in which the required conditions may be established and the flow of the air may be parallel or counterflow to the movement of dextrose. The agglomerating treatment may also be carried out in stepwise stages.

Three terminal actions occur when wet dextrose is dried under the conditions aforementioned. First, the dextrose and moisture are heated to a constant temperature which approaches the wet bulb temperature of the air; next, the moisture is evaporated into the air at constant temperature; and third, the dextrose is heated to its final discharge temperature. The amount of coarse dextrose may be increased by increasing the wet bulb temperature and, thus, the humidity of the air. The time to complete the first stage of drying is prolonged at the higher humidity and the chance of particles agglomerating is increased. Optimum agglomeration occurs when the wet and dry bulb temperatures are about 125° F. to 135° F. and about 150° F. to 190° F., respectively.

By means of my process, it is possible to produce dextrose agglomerates having particle sizes ranging from those which are retained on a 14 mesh screen (about the maximum desired) to those retained on a 60 mesh screen (at least about 70 percent) or an 80 mesh screen (at least 99 percent) or a 100 mesh screen (at least 90 percent). By comparison, particle sizes of commercial dextrose hydrate vary from those retained on a 14 mesh screen (very small quantity) to those passing a 200 mesh or smaller size screen opening. The bulk of commercial dextrose hydrate crystal agglomerates will pass through a 60 mesh screen. One advantage of the present invention is that it permits control of particle size desired.

Equipment which has been used satisfactorily in carrying out the invention consists of a rotary dryer equipped with means for humidifying the air, recirculating the humid air through a heat exchanger and for controlling the wet and dry bulb temperatures of the air.

The invention will appear more clearly from the following detailed description taken in connection with the single figure, showing a preferred embodiment of the inventive idea, and the examples. The examples and equipment shown are intended to be illustrative only and not in any sense limiting the invention.

Referring now to the figure, dextrose fines or dextrose centrifuge cake are introduced at supply inlet 1 to dryer 2. The dextrose is moved forward by lifting flights not shown. As the dextrose is moved forward, it meets with air flowing countercurrently to the movement of the dextrose. In starting the air cycle, fresh air, as needed, is introduced at 3 and return air to be recycled is introduced at 4. The humidity of the air is controlled by injecting dry steam at 5. The air then enters air heater 6 equipped with steam heating coils 7. Wet and dry bulb temperature recorders are located at 8 near the dryer inlet. Exaust air is sent through air duct 9 to cyclone collector 10 to remove fines after which it is returned to the system via air duct 11. The agglomerated dextrose is discharged at 12.

In Table I below are tabulated conditions under which experiments were conducted in accordance with the process above described, and the results obtained. The materials treated were wet cake containing 15 to 15.5 percent moisture from the first centrifuging operation in separating dextrose hydrate crystals from the mother liquor in the manufacture of dextrose and dextrose fines which contained 7.0 to 9.5 percent of moisture.

Table I

|  | Centrifuge Cake Supply | Dextrose Fines[1] Supply |
|---|---|---|
| Inlet Air: | | |
|   Dry Bulb Temperature _____ °F__ | 160 | 160 |
|   Wet Bulb Temperature _____ do___ | 125 | 135 |
|   Relative Humidity _____ percent__ | 38 | 52 |
|   Air Rate _____ c.f.m__ | 250 | 250 |
| Exit Air: | | |
|   Dry Bulb Temperature _____ °F__ | 139 | 151 |
|   Wet Bulb Temperature _____ do___ | 124 | 134 |
|   Relative Humidity _____ percent__ | 67 | 64 |
| Supply Rate _____ lb./hr__ | 50 | 100 |
| Supply Moisture _____ percent__ | 15.0–15.5 | 7.0–9.5 |
| Product Moisture _____ do___ | 8.0–9.0 | 8.0–9.1 |
| Screen Analysis of Product: | | |
|   On 14 Mesh _____ percent__ | 5.0 | 8.8 |
|   On 42 Mesh _____ do___ | 29.3 | 19.4 |
|   On 60 Mesh _____ do___ | 70.1 | 76.9 |
|   On 80 Mesh _____ do___ | 94.6 | 94.9 |
|   On 100 Mesh _____ do___ | 98.0 | 97.6 |

[1] Screen Analysis of Dextrose Fines:                         Percent
    On 14 Mesh _____ 0
    On 20 Mesh _____ 0
    On 42 Mesh _____ 0.7
    On 60 Mesh _____ 34.1
    On 80 Mesh _____ 68.7
    On 100 Mesh _____ 76.0
    Through 100 Mesh _____ 24.0

We claim:

1. A process for agglomerating dextrose which comprises agitating wet crystalline dextrose containing not more than 22 percent of moisture and simultaneously contacting the same with moving air which has a dry bulb temperature within the range of about 150° F. to and including superheated steam and a wet bulb temperature within the range of about 90° F. to about 160° F.

2. Process according to claim 1 wherein the air after use is treated to adjust it to the said wet and dry bulb temperatures and returned to the process with additional dextrose to be agglomerated.

3. Process according to claim 2 wherein the wet bulb temperature is within the range of about 125° F. to 135° F. and the dry bulb temperature is within the range of about 150° F. to 190° F.

References Cited in the file of this patent

UNITED STATES PATENTS

| 1,693,118 | Newkirk _____ Nov. 27, 1928 |
| 1,886,941 | Corsan _____ Nov. 8, 1932 |
| 2,854,359 | Wilson et al. _____ Sept. 30, 1958 |

OTHER REFERENCES

Chemistry and Industry of Starch by Kerr, 1944, Acad. Press Inc., N.Y., pp. 286–287.